(12) United States Patent
Nilsson

(10) Patent No.: US 11,627,535 B2
(45) Date of Patent: Apr. 11, 2023

(54) EMISSION RESTRICTED TRANSMISSION OF REFERENCE SIGNALS

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 777 days.

(21) Appl. No.: 16/550,651

(22) Filed: Aug. 26, 2019

(65) Prior Publication Data

US 2021/0068060 A1 Mar. 4, 2021

(51) Int. Cl.
*H04W 52/32* (2009.01)
*H04L 5/00* (2006.01)
*H04L 25/02* (2006.01)
*H04W 72/04* (2009.01)
*H04W 72/044* (2023.01)

(52) U.S. Cl.
CPC ......... *H04W 52/325* (2013.01); *H04L 5/0051* (2013.01); *H04L 25/0226* (2013.01); *H04W 72/0473* (2013.01)

(58) Field of Classification Search
CPC ............ H04W 52/325; H04W 72/0473; H04L 5/0051; H04L 25/0226; H04L 5/0023; H04L 5/0048; H04B 7/0691; H04B 7/0608
See application file for complete search history.

(56) References Cited

U.S. PATENT DOCUMENTS

| | | | |
|---|---|---|---|
| 11,310,010 B2* | 4/2022 | Faxér | H04L 27/2601 |
| 2014/0233665 A1* | 8/2014 | Clevorn | H04B 7/061 375/267 |
| 2018/0077683 A1* | 3/2018 | Rico Alvarino | H04B 7/0404 |
| 2019/0372732 A1* | 12/2019 | Faxér | H04B 7/0456 |
| 2020/0107279 A1* | 4/2020 | Sun | H04W 72/0473 |
| 2020/0145079 A1* | 5/2020 | Marinier | H04B 7/0617 |
| 2020/0313815 A1* | 10/2020 | Sridharan | H04B 7/0689 |
| 2021/0135812 A1* | 5/2021 | Sridharan | H04B 7/0456 |
| 2021/0351827 A1* | 11/2021 | Hao | H04B 7/0639 |
| 2021/0352596 A1* | 11/2021 | Liu | H04W 8/24 |
| 2021/0384955 A1* | 12/2021 | Varatharaajan | H04L 5/0048 |
| 2021/0392590 A1* | 12/2021 | Zhu | H04W 52/16 |
| 2022/0103223 A1* | 3/2022 | Zhao | H04B 7/0404 |
| 2022/0123887 A1* | 4/2022 | Zander | H04B 7/0602 |

FOREIGN PATENT DOCUMENTS

WO WO-2018127781 A1 * 7/2018 ........... H04B 7/0456

* cited by examiner

*Primary Examiner* — Christopher P Grey
(74) *Attorney, Agent, or Firm* — Rothwell, Figg, Ernst & Manbeck, P.C.

(57) ABSTRACT

A user equipment (UE) determines a power management parameter for at least one of its antennas, maps transmit ports to antennas based at least in part on the power management parameter, and transmits a set of references signals on the antennas according to the mapping.

21 Claims, 11 Drawing Sheets

$$\begin{bmatrix} A1 \\ A2 \\ A3 \\ A4 \end{bmatrix} = \begin{bmatrix} V_{11} & V_{12} & V_{13} & V_{14} \\ V_{21} & V_{22} & V_{23} & V_{24} \\ V_{31} & V_{32} & V_{33} & V_{34} \\ V_{41} & V_{42} & V_{43} & V_{44} \end{bmatrix} \times \begin{bmatrix} SRS1 \\ SRS2 \\ SRS3 \\ SRS4 \end{bmatrix}$$

FIG. 5A $$V1 = \begin{bmatrix} 1 & 0 & 0 & 1 \\ 0 & 1 & 0 & 0 \\ 0 & 0 & 1 & 0 \\ 0 & 0 & 0 & 0 \end{bmatrix}$$

FIG. 5B $$V2 = \begin{bmatrix} 1 & 0 & 0 & 1/3 \\ 0 & 1 & 0 & 1/3 \\ 0 & 0 & 1 & 1/3 \\ 0 & 0 & 0 & 0 \end{bmatrix}$$

FIG. 5C $$V3 = \begin{bmatrix} 1 & 0 & 0 & 1/4 \\ 0 & 1 & 0 & 1/4 \\ 0 & 0 & 1 & 1/4 \\ 0 & 0 & 0 & 1/4 \end{bmatrix}$$

FIG. 5D

```
-- ASN1START
-- TAG-SRS-CONFIG-START

SRS-Config ::=                SEQUENCE {
    srs-ResourceSetToReleaseList      SEQUENCE (SIZE(1..maxNrofSRS-ResourceSets)) OF SRS-ResourceSetId
OPTIONAL,   -- Need N
    srs-ResourceSetToAddModList       SEQUENCE (SIZE(1..maxNrofSRS-ResourceSets)) OF SRS-ResourceSet
OPTIONAL,   -- Need N
    srs-ResourceToReleaseList         SEQUENCE (SIZE(1..maxNrofSRS-Resources)) OF SRS-ResourceId       OPTIONAL,
-- Need N
    srs-ResourceToAddModList          SEQUENCE (SIZE(1..maxNrofSRS-Resources)) OF SRS-Resource         OPTIONAL,
-- Need N
    tpc-Accumulation          ENUMERATED {disabled}                     OPTIONAL,  -- Need S
    ...
}

SRS-ResourceSet ::=           SEQUENCE {
    srs-ResourceSetId         SRS-ResourceSetId,
    srs-ResourceIdList        SEQUENCE (SIZE(1..maxNrofSRS-ResourcesPerSet)) OF SRS-ResourceId   OPTIONAL, --
Cond Setup
    resourceType              CHOICE {
        aperiodic             SEQUENCE {
            aperiodicSRS-ResourceTrigger      INTEGER (1..maxNrofSRS-TriggerStates-1),
            csi-RS                NZP-CSI-RS-ResourceId              OPTIONAL, -- Cond NonCodebook
            slotOffset            INTEGER (1..32)                    OPTIONAL, -- Need S
            ...,
            [[
            aperiodicSRS-ResourceTriggerList-v1530    SEQUENCE (SIZE(1..maxNrofSRS-TriggerStates-2))
                              OF INTEGER (1..maxNrofSRS-TriggerStates-1) OPTIONAL -- Need M
            ]]
        },
        semi-persistent       SEQUENCE {
            associatedCSI-RS          NZP-CSI-RS-ResourceId              OPTIONAL, -- Cond NonCodebook
            ...
        },
        periodic              SEQUENCE {
            associatedCSI-RS          NZP-CSI-RS-ResourceId              OPTIONAL, -- Cond NonCodebook
            ...
        }
    },
```

FIG. 8A

```
    usage                       ENUMERATED {beamManagement, codebook, nonCodebook, antennaSwitching},
    alpha                       Alpha                               OPTIONAL, -- Need S
    p0                          INTEGER (-202..24)                  OPTIONAL, -- Cond Setup
    pathlossReferenceRS             CHOICE {
        ssb-Index                   SSB-index,
        csi-RS-Index                NZP-CSI-RS-ResourceId
    }                                                               OPTIONAL, -- Need M
    srs-PowerControlAdjustmentStates    ENUMERATED { sameAsFci2, separateClosedLoop}        OPTIONAL, --
Need S
    ...
}

SRS-ResourceSetId ::=       INTEGER (0..maxNrofSRS-ResourceSets-1)

SRS-Resource ::=            SEQUENCE {
    srs-ResourceId              SRS-ResourceId,
    nrofSRS-Ports               ENUMERATED {port1, ports2, ports4},
    ptrs-PortIndex              ENUMERATED {n0, n1 }                OPTIONAL, -- Need R
    transmissionComb            CHOICE {
        n2                      SEQUENCE {
            combOffset-n2           INTEGER (0..1),
            cyclicShift-n2          INTEGER (0..7)
        },
        n4                      SEQUENCE {
            combOffset-n4           INTEGER (0..3),
            cyclicShift-n4          INTEGER (0..11)
        }
    },
    resourceMapping             SEQUENCE {
        startPosition               INTEGER (0..5),
        nrofSymbols                 ENUMERATED {n1, n2, n4},
        repetitionFactor            ENUMERATED {n1, n2, n4}
    },
    freqDomainPosition          INTEGER (0..67),
    freqDomainShift             INTEGER (0..268),
    freqHopping                 SEQUENCE {
        c-SRS                   INTEGER (0..63),
        b-SRS                   INTEGER (0..3),
        b-hop                   INTEGER (0..3)
    },
    groupOrSequenceHopping      ENUMERATED { neither, groupHopping, sequenceHopping },
    resourceType                CHOICE {
        aperiodic               SEQUENCE {
            ...
        },
```

FIG. 8B

```
    semi-persistent                SEQUENCE {
        periodicityAndOffset-sp          SRS-PeriodicityAndOffset,
        ...
    },
    periodic                       SEQUENCE {
        periodicityAndOffset-p           SRS-PeriodicityAndOffset,
        ...
    }
    },
    sequenceId                     INTEGER (0..1023),
    spatialRelationInfo            SRS-SpatialRelationInfo          OPTIONAL,  -- Need R
    ...
}

SRS-SpatialRelationInfo ::=    SEQUENCE {
    servingCellId                  ServCellIndex                    OPTIONAL,  -- Need S
    referenceSignal                CHOICE {
ssb-Index                 SSB-Index,
      csi-RS-Index                 NZP-CSI-RS-ResourceId,
      srs                          SEQUENCE {
         resourceId                SRS-ResourceId,
         uplinkBWP                 BWP-Id
      }
    }
}

SRS-ResourceId ::=             INTEGER (0..maxNrofSRS-Resources-1)

SRS-PeriodicityAndOffset ::=   CHOICE {
    sl1                   NULL,
    sl2                   INTEGER(0..1),
    sl4                   INTEGER(0..3),
    sl5                   INTEGER(0..4),
    sl8                   INTEGER(0..7),
    sl10                  INTEGER(0..9),
    sl16                  INTEGER(0..15),
    sl20                  INTEGER(0..19),
    sl32                  INTEGER(0..31),
    sl40                  INTEGER(0..39),
    sl64                  INTEGER(0..63),
    sl80                  INTEGER(0..79),
    sl160                 INTEGER(0..159),
    sl320                 INTEGER(0..319),
    sl640                 INTEGER(0..639),
    sl1280                INTEGER(0..1279),
    sl2560                INTEGER(0..2559)
}

-- TAG-SRS-CONFIG-STOP
-- ASN1STOP
```

FIG. 8C

EMISSION RESTRICTED TRANSMISSION OF REFERENCE SIGNALS

TECHNICAL FIELD

This disclosure relates to apparatuses and methods for the transmission of reference signals, such as Sounding Reference Signal (SRS) transmissions. Some aspects of this disclosure relate to reference signal mappings and transmissions with emission restrictions that affect the power on one or more antennas of a user equipment (UE).

BACKGROUND

Reference signals may be communicated between a transmit/receive point (TRP) (e.g., an access point, such as a base station, or a component of an access point) and a user equipment (UE) (e.g., a mobile communication device, computer, etc.). These reference signals may be used, for instance, to establish or evaluate the channel between the TRP and UE. This may be with respect to the downlink (DL), uplink (UL), or both. For example, in New Radio (NR), two types of reference signals (RSs) that might be used for DL beam management operations are: (i) the channel state information RS (CSI-RS) and (ii) the synchronization signal/physical broadcast control channel (SS/PBCH) block, or SSB for short. Some examples of UL reference signals include the Sounding Reference Signal (SRS) and Physical Uplink Control Channel (PUCCH) transmissions.

For SRS, each SRS resource set can be associated with one usage (e.g., beamManagement, codebook, nonCodebook, antennaSwitching). SRS resources with usage "codebook" are used to sound the different UE antennas and let the base station determine suitable precoders, rank, and the modulation and coding scheme (MCS) for coming UL transmissions. How each SRS port is mapped to each UE antenna is up to UE implementation, but it is expected that one SRS port will be transmitted per UE antenna, such that the SRS port to antenna port mapping will be an identity matrix. SRS resources with usage "nonCodebook" are used to sound different potential precoders by the UE. In this case, the UE determines a set of candidate precoders based on reciprocity, transmits one SRS resource per candidate precoder, and the base station can then select which precoders the UE should use for coming PUSCH transmissions. One UL layer will be transmitted per indicated candidate precoder, and how the UE map the SRS resources to the antenna ports is up to UE implementation and depends on the channel. SRS resources with usage "antennaSwitching" are used to sound the channel in UL so that the base station can use reciprocity to determine suitable DL precoders. If the UE has the same number of transmit (TX) and receive (RX) chains, the UE will transmit one SRS port per UE antenna. Which SRS port is transmitted from which antenna is, however, up to UE implementation. SRS resources with usage "beamManagement" is typically used for higher frequencies (FR2), and used to find a suitable analog beam at the UE by transmitting different SRS resources in different UE TX beams.

It is possible that a UE's output power (e.g., for certain UE transmit beams that transmit power towards sensitive objects, such as a human body) will need to be restricted. This could have an effect on reference signal transmissions, such as with respect to SRS sounding. Thus, there is a need for improved reference signal mapping and/or transmission that can account for output power restrictions.

SUMMARY

According to embodiments, an output power restriction (e.g., a Power Management Maximum Power Reduction (P-MPR)) can be considered when port mapping reference signals to a plurality of antennas of a UE.

According to embodiments, a method is provided for transmitting a set of reference signals from a UE having a plurality of antennas. They may be transmitted, for example, to a TRP. The method may include mapping a plurality of transmit ports for the set of reference signals to the plurality of antennas, wherein the mapping is based at least in part on a power management parameter for at least one of the plurality of antennas. The method may further include transmitting the set of reference signals according to the mapping, wherein the transmit power used by at least one of the antennas for the transmitting is different from the transmit power used by another of the plurality of antennas for the transmitting. In some embodiments, the set of reference signals is a Sounding Reference Signal (SRS) resource set and the plurality of transmit ports are SRS ports corresponding to the set of reference signals. Additionally, the power parameter may relate to an output restriction for one or more antennas, such as a P-MPR value. The transmit power used on at least one of the antennas can be higher than a maximum transmit power indicated by the P-MPR value. In some embodiments, the UE determines the power management parameter. For instance, the UE may comprise one or more detectors, wherein determining the power management parameter is performed using measurements from at least one of the detectors. In certain aspects, the power management parameter is determined based at least in part on an effort to avoid transmission towards a human being.

In some embodiments, a UE is provided, wherein the UE is adapted to perform the method. The UE may comprise, for instance, a memory and a processor, wherein the processor is configured to perform the method. Some embodiments provide a computer program comprising instructions that when executed by processing circuitry of a UE, cause the UE to perform the method. The computer program may be contained on a carrier, wherein the carrier is one of an electronic signal, an optical signal, a radio signal, and a computer readable storage medium.

According to some embodiments, a method of receiving one or more reference signals from a UE at a node, such as a TRP, is provided. The method may include sending a reference signal configuration to a UE, optionally sending a trigger relating to the configuration, and then receiving a set of reference signals from the UE, wherein the UE transmit port mapping was based at least in part on a power management parameter of the UE restricting the output of at least one UE transmit antenna. That is, methods are provided for a node to receive reference signals from a UE performing one or more steps described herein. In some embodiments, the TRP can signal to the UE to perform one or more out power restriction processes, including determining a P-MPR value, detecting a human or other sensitive object, and/or mapping and transmitting reference signals in accordance with a power restriction.

In some embodiments, a TRP is provided, wherein the TRP is adapted to perform the method. The TRP may comprise, for instance, a memory and a processor, wherein the processor is configured to perform the method. Some embodiments provide a computer program comprising instructions that when executed by processing circuitry of a TRP, cause the TRP to perform the method. The computer program may be contained on a carrier, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

FIGS. 5A-5D illustrate antenna port mappings according to some embodiments.

FIGS. 8A-8C illustrate a Sounding Reference Signal (SRS) configuration for use with one or more embodiments.

DETAILED DESCRIPTION

Figure 1:
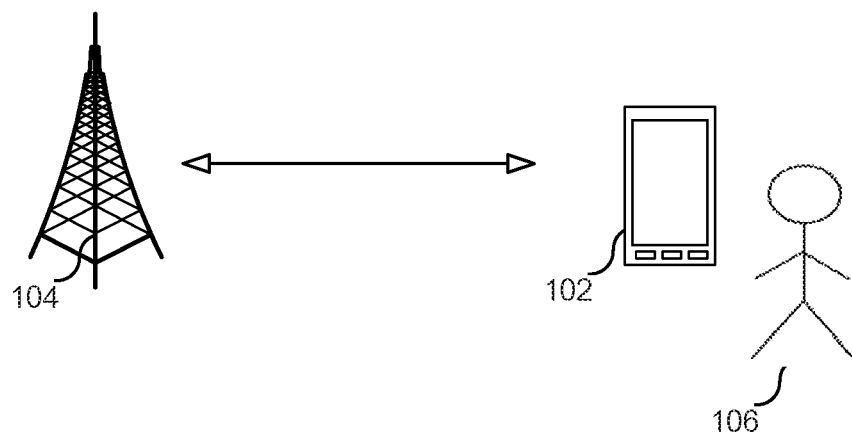
FIG. 1 illustrates a wireless communication system according to some embodiments.

A system 100 according to some embodiments is illustrated in FIG. 1. The system may include, for instance, a user equipment (UE) 102 and a transmit/receive point (TRP) 104. As shown in FIG. 1, there may also be a sensitive object 106. According to certain aspects, there may be a need or desire to restrict the output power of UE 102 for certain UE beams that transmit power in directions towards sensitive objects 106, such as a human body. For example, it is possible that a subset of UE antennas are transmitting in the direction of a sensitive object 106, and therefore have to reduce their maximum allowed output power. In this case, different UE antennas will have different maximum allowed output power.

The UE 102 may be restricted by a power management parameter that relates to a maximum power for an antenna. One example of such a power management parameter is a Power Management Maximum Power Reduction (P-MPR) parameter, which in effect, identifies how much the UE 102 needs to reduce the output power below the maximum allowed output power due to radio frequency (RF) exposure requirements. In some embodiments, the required output power reduction could be as high as 18 dB, which would severely reduce the link budget for the affected UE antennas. This could affect, for instance, reference signaling from the UE 102 and provide inaccurate information to the TRP 104 regarding the quality of the channel or antennas of the UE 102. In situations with reciprocity between the UE 102 and TRP 104, this could further affect the DL channel as well.

This problem can be illustrated, for instance, using the Sounding Reference Signal (SRS) as an example. While SRS is used as an example, the disclosures and embodiments herein can be applied to other signals communicated from the UE that are subject to power restrictions. The output power for SRS can be handled by the SRS power control loop, which defines the total output power that the UE 102 should apply for a given SRS transmissions. One or more 3GPP standards also specify how the UE 102 should divide the output power between the multiple transmitted SRS ports, in case the triggered SRS resource set consists of multiple SRS ports. The SRS power scaling is currently specified in TS 38.213, Section 7.3 as: "For SRS, a UE splits a linear value P^_(SRS,b,c) (i,q_s,l) of the transmit power P_(SRS,b,c)(i,q_s,l) on active UL BWP b of carrier f of serving cell c equally across the configured antenna ports for SRS." This means that if the TRP 104 triggers an SRS resource set with multiple SRS ports, the SRS ports in that SRS resource set should be transmitted with the same output power. However, the SRS link budget is often the limiting factor for DL reciprocity based precoding. Hence the link budget for SRS is important, for both DL and UL transmission and SRS should be sounded to the TRP 104 according to the maximum abilities of UE 102.

To further illustrate the present problem, if a UE 102 is triggered to transmit an SRS resource set with multiple SRS ports, and the UE 102 transmits one SRS port per antenna port (this would be expected at least for SRS resource set with usage "codebook" or "antennaSwitching"), each of the SRS ports would need to be transmitted with the same output power. However, if one of the UE antennas is pointing in the direction of the human body and is therefore affected by P-MPR, the UE might need to transmit the SRS port associated with that antenna with lower output power than desired. Because all SRS ports shall be transmitted with the same output power, other SRS ports transmitted on other UE antennas would need to reduce their output power as well. This might lead to poor SRS link budget for all SRS ports in an SRS transmission occasion, leading to deteriorated DL reciprocity based transmission and/or UL transmission.

Accordingly, some embodiments provide for a UE 102 that can determine output power restrictions (e.g., based on P-MPR) for one or a subset of the UE antennas, and adapt the SRS port to antenna port mapping to reduce the effect on average SRS output power over all the SRS ports belonging to one SRS resource set. This could include the UE 102 determining the P-MPR (or any other power restriction) for the different UE antennas. If for example one UE antenna is suffering from high P-MPR, the UE 102 applies an SRS port to antenna port mapping that reduces the negative impact of that P-MPR on the SRS link budget. An advantage of this approach is that the SRS link budget can be increased in the case that a subset of the UE 102 antennas are suffering from high P-MPR, leading to improved channel estimation for DL reciprocity based transmission and/or UL codebook based/non-codebook based transmission.

Figure 2A:
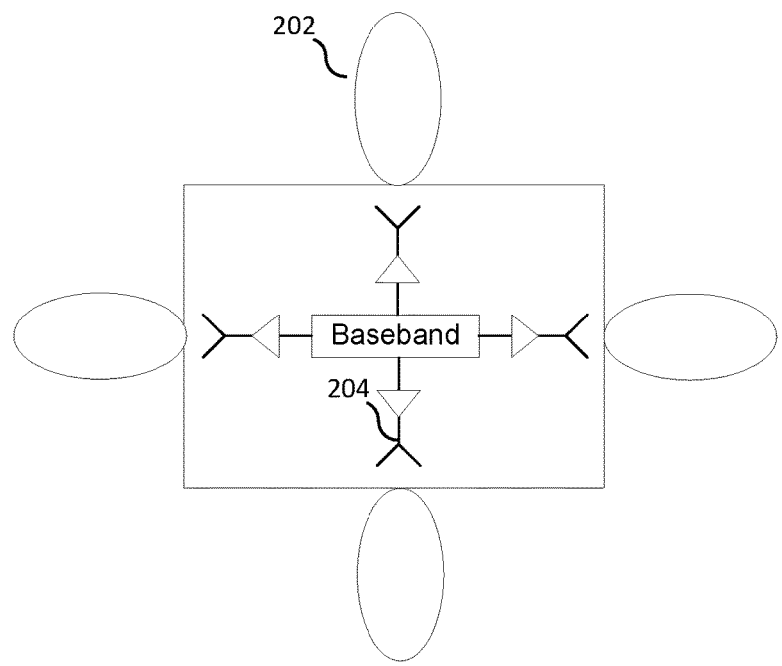
FIGS. 2A and 2B illustrate examples of antenna elements according to some embodiments.
Figure 2B:
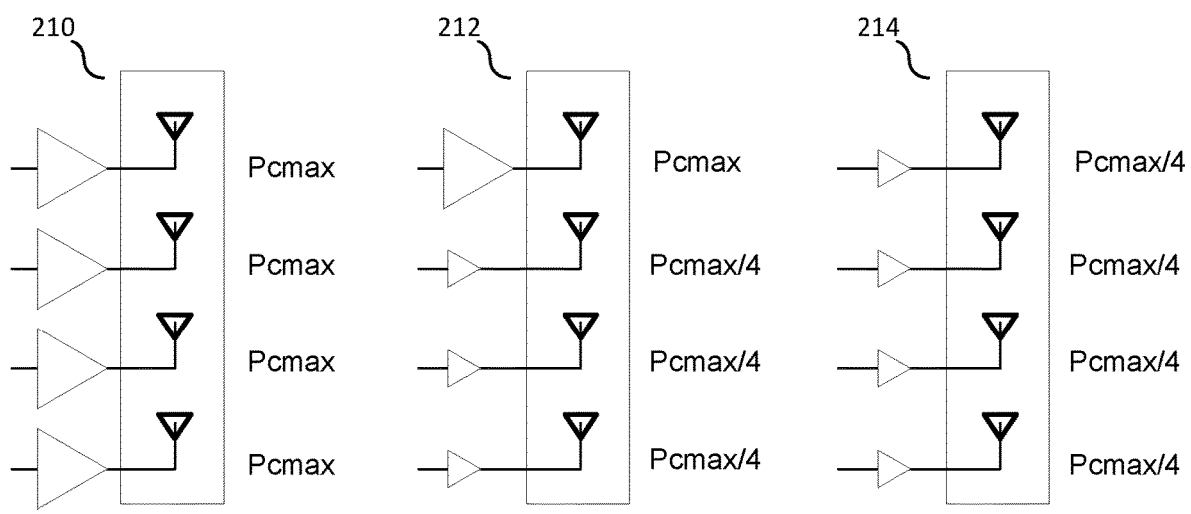

Referring now to FIGS. 2A and 2B, aspects of the antennas of UE 102 are illustrated according to some embodiments.

As shown in FIG. 2A, the antennas of UE 102 may include one or more antenna elements 202. Each of these antenna elements 202 may correspond to an antenna port, and may be connected to baseband processing via one or more ports and/or power amplifiers 204. According to embodiments, an antenna port can have a one-to-one or one-to-many relationship to physical antenna elements. For instance, the UE 102 may use an antenna panel, or each antenna element 202 may itself be an antenna panel. The UE 102 may use digital antennas/beamforming, analog antennas/beamforming, or a hybrid approach. Similarly, a given antenna panel of the UE 102 may use digital antennas/beamforming, analog antennas/beamforming, or a hybrid approach.

In some embodiments, at lower frequencies (e.g., below 6 GHz) the UE 102 might use a purely digital antenna implementation, with one baseband port per antenna element. At mm-Wave frequencies, the UE 102 may further have panel implementations with analog beamforming within each panel. An example, for instance with respect to NR implementation, is that the UE 102 is equipped with four baseband ports and four antenna elements 202 pointing in different directions. Depending on the carrier frequencies, the antenna element patterns can be more or less directional. For lower frequencies (e.g., around 700 MHz-2 GHz) the antenna patterns may be omni-directional Additionally, and referring to FIG. 2B, the UE 102 may have one or more configurations regarding control over output power on the TX chains. For instance, a UE could transmit with full output power for each of the UE TX chains (210); a UE could transmit with full output power for only a subset of all the UE TX chains (220); and/or a UE could not transmit with full output power on any of the UE TX chains. In some instance, different UE antennas/panels could have different available output power (e.g., with respect to antenna implementation 212).

Figure 3:
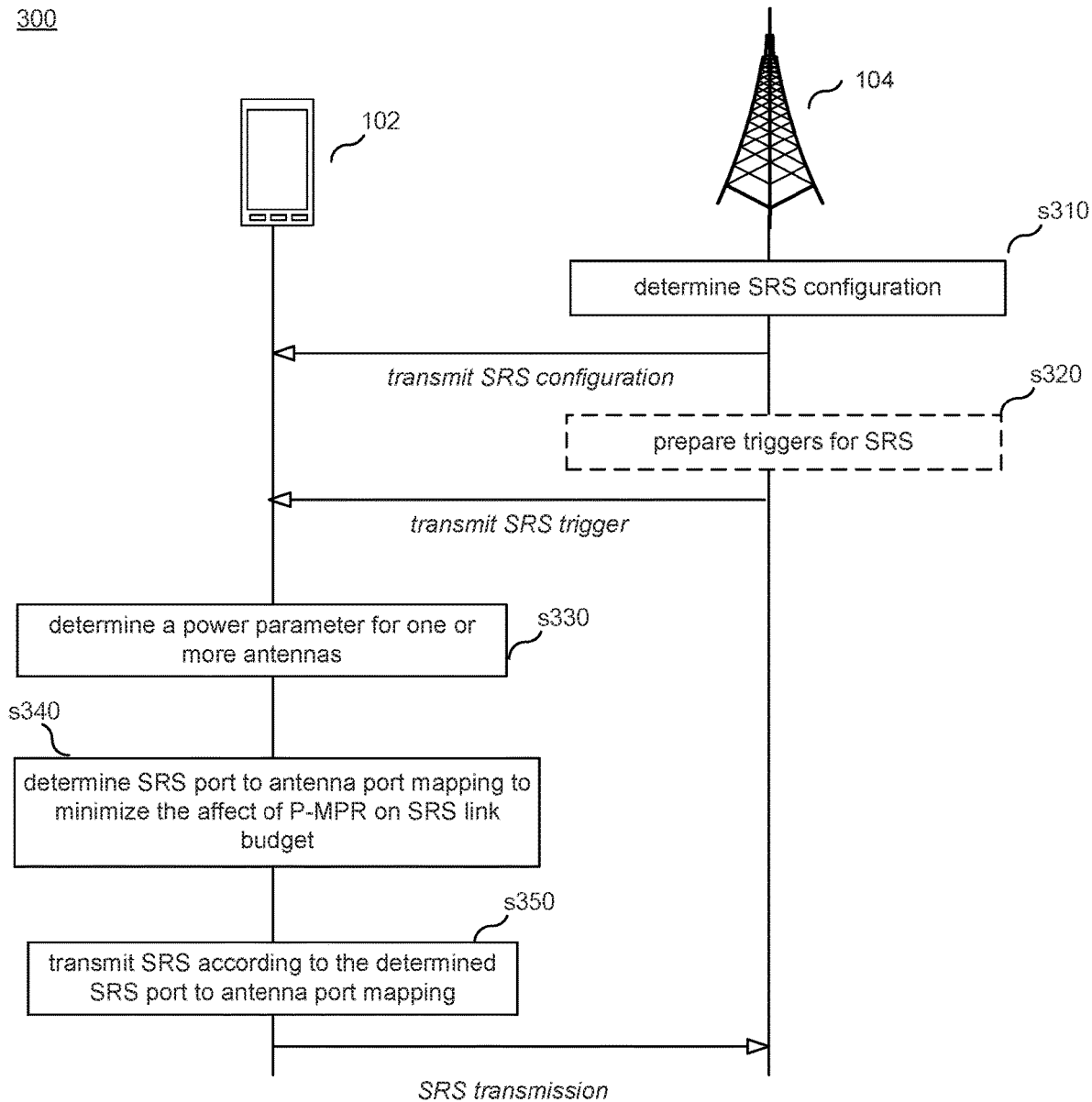
FIG. 3 is a flow chart illustrating a process according to some embodiments.

Referring now to the flow diagram of FIG. 3, the signaling between two nodes (e.g., a UE 102 and TRP 104) is illustrated according to some embodiments. The process 300 is illustrated using SRS as an example, but may be applied using other signals and messages, including other uplink transmissions and reference signals from a UE 102.

The process 300 may begin with step s310, in which a TRP 104 determines an SRS configuration and transmits the configuration to the UE 102. How the SRS transmission should be performed by the UE 102 can be defined according to one or more 3GPP standards, including the format for SRS-Config, and signaled to the UE from the TRP with Radio Resource Control (RRC) signaling. The SRS-Config IE can be used to configure SRS transmissions, in which the configuration defines a list of SRS-Resources and a list of SRS-ResourceSets in some embodiments. The configuration may be of various types, including periodic, aperiodic, and semi-persistent. In this example, the SRS-Config contains a list of SRS-Resources (the list constitutes a "pool" of resources) wherein each SRS resource contains information on the physical mapping of the reference signal on the time-frequency grid, time-domain information, sequence IDs, codes, etc. In this respect, one or more references may be transmitted from UE 102 at the same time, at the same frequencies, and/or from the same antenna. For some types of configurations, the SRS-Config also contains a list of SRS resource sets, which contains a list of SRS resources and an associated DCI trigger state. Thus, when a certain DCI state is triggered, it indicates that the SRS resources in the associated set shall be transmitted by the UE.

For configurations in which a subsequent trigger is used, the process 300 may include step s320, in which an SRS trigger is prepared and transmitted to the UE 102. This could be used, for instance, with an aperiodic configuration in which the network (e.g., TRP 104) triggers the transmission of the set of SRS-Resources using a configured aperiodicSRS-ResourceTrigger. This could be carried in the physical layer downlink control information, such as "L1 DCI," for instance for aperiodic signaling. In the case of a semi-persistent configuration, the MAC-CE (control element) may be used.

In step s330, the UE 102 determines one or more power parameters. For instance, the UE 102 can determine the P-MPR for the different UE antennas. This can be done using different sensors or measurements. This step may be performed before or after steps s310 and s320.

In step s340, the UE 102 determines an SRS port to antenna port mapping that reduces the impact of P-MPR on SRS output power. Some examples of port-antenna mappings are shown in FIGS. 5A-5D.

In step s350, the UE 102 transmits the SRS ports according to the SRS port to antenna port mapping determined in step s340.

As an example, a UE may be triggered for SRS transmission for DL reciprocity, with an SRS set with usage "antennaSwitching." In this example, UE Antenna 1 is suffering from P-MPR of 15 dB, meaning that the maximum allowed output power of that antenna is 8 dBm (assuming 23 dBm max output power of the UE 102). Previously, the UE would have had to transmit one SRS port per UE antenna, meaning that the maximum allowed output power per SRS port would 8 dBm, since all SRS ports should be transmitted with the same output power, according to the NR standard specification. If the UE already had a challenging UL link budget, the additional reduction in output power might lead to the situation that SRS ports cannot be received by the TRP or the channel estimation might be so poor that the DL reciprocity based performance gets significantly deteriorated. However, and according to embodiments, the UE 102 instead of transmitting one SRS port per UE antennas, performs an SRS port to antenna port mapping that reduces the impact of P-MPR on the output power of the SRS ports. For instance, a UE 102 can transmit one SRS port on UE Antenna 2 and UE Antenna 3, and two SRS ports on Antenna 4. In this way, the P-MPR will not limit the output power of any of the SRS ports. If the UE of Antenna 4 is connected to a PA that is capable of full power (e.g., 23 dBm), each SRS port can be transmitted with 17 dBm output power each. It is possible that the PA connected to UE Antenna 4 only supports 17 dBm, in this case, since two SRS ports will share the 17 dBm output power of that PA, all SRS ports can only be transmitted with 14 dBm each. However, this would still 6 dB better output power than could be achieved with current implementations.

In some embodiments, the UE 102 evaluates the different maximum possible output power of the different UE antennas and transmits two SRS ports on the UE antenna with the highest available output power, and in this way, minimizes the reduction in output power of the SRS ports.

In some embodiments, the SRS port to antenna port mapping is designed such that the total allowed transmit power over all SRS ports is maximized. For example, the UE 102 may find the SRS port to antenna port mapping that maximizes the following: Output power SRS port1+output power SRS port 2+ . . . +output power SRS port N. This optimization could take into account the power constraints per antenna element, both due to maximum PA power per antenna and P-MPR per antenna.

Figure 4A:
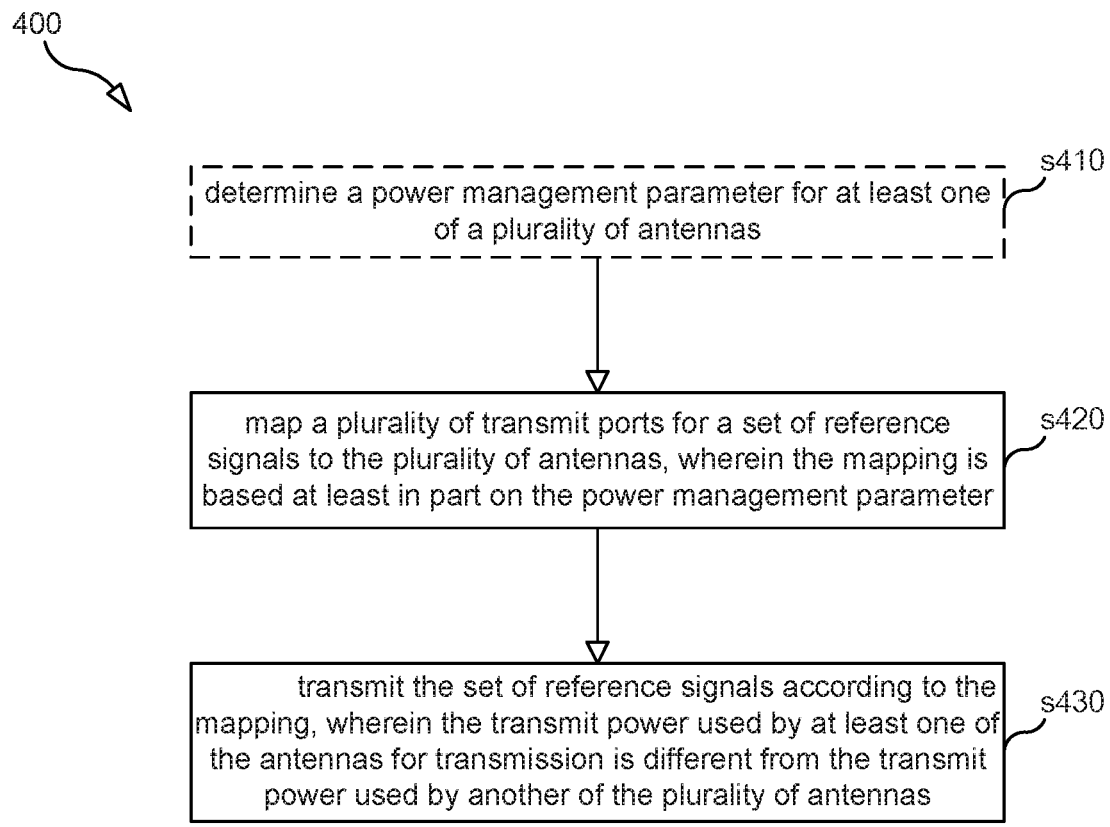
FIGS. 4A and 4B are flow charts illustrating processes according to some embodiments.

Referring to FIG. 4A, a process 400 according to some embodiments is shown. The process 400 may be performed, for example, by UE 102 and used to transmit a set of reference signals to another node (e.g., TRP 104).

Process 400 may begin with step s410, in which UE 102 determines a power management parameter for at least one of a plurality of the UE antennas. The power management parameter may be, for example, a restriction on the maximum output power on one or more of the antennas. For instance, the parameter may be a P-MPR value. According to embodiments, the power parameter/restriction is based at least in part on the presence of a sensitive object 106. Further, the UE 102 may comprise one or more detectors, where determining step s410 is performed using measurements from at least one of the detectors. Detectors could include, for example, one or more cameras, audio or thermal sensors, RF sensors, GPS units, proximity detectors, and impedance measurement devices. In some embodiments, the power management parameter is determined based at least in part on avoidance of transmission towards a human being. Moreover, determining may be based, at least in part, on the receipt of information from one or more local sources regarding sensitive objects 106, such as a co-located UE or detector. In some embodiments, step s410 may not be performed in a particular round of transmission. For instance a power management parameter may already be known, or signaled to, the UE 102.

In step s420, the UE maps a plurality of transmit ports for the set of reference signals to a plurality of UE antennas, wherein the mapping is based at least in part on the power management parameter for at least one of the plurality of antennas. In some embodiments, at least one of the plurality of antennas is an antenna panel. In some embodiments, the set of reference signals is an SRS resource set and the plurality of transmit ports are SRS ports corresponding to the set of reference signals. The mapping may be, for example, as illustrated with respect to FIGS. 5A-5D. Further, and in accordance with embodiments, the mapping is performed such that each transmit port is transmitted with the same output power. In this respect, the requirements of 38.213, Section 7.3 can be met while still optimizing the transmission of an SRS resource set.

According to some embodiments the mapping step s420 comprises mapping first and second transmit ports to a first antenna, and mapping no transmit ports to a second antenna. In some embodiments, the mapping comprises mapping a first transmit port to a first antenna, mapping a second transmit port to a second antenna, and mapping a third transmit port to the first and second antennas. The third transmit port in this embodiment may be mapped equally to the first and second antennas. The transmit port may also be mapped unequally. Additionally, in certain aspects, no transmit imports are mapped to a third antenna.

According to some embodiments, the mapping step s420 comprises mapping a first transmit port to a first antenna, mapping a portion of a second transmit port to the first antenna, and mapping a portion of the second transmit port to a second antenna, wherein a maximum transmit power of the second antenna is restricted by the power management parameter.

According to some embodiments, an optimization determination may be made as part of the mapping process. For instance, the mapping can be optimized to maximize the total allowed transmit power of the UE over all transmit ports for the set of reference signals. The maximization of total output power can be based on both a consideration of the maximum PA power per antenna, and the P-MPR per antenna. As such, the process 400 may also include determination of the maximum PA power of one or more antennas. In some embodiments, UE 102 may determine that the first antenna has the highest available output power of the plurality of antennas, and then the mapping is based at least in part on that determination.

In step s430, the UE transmits the set of reference signals according to the mapping of step s420, wherein the transmit power used by at least one of the antennas for the transmitting is different from the transmit power used by another of the plurality of antennas for the transmitting. According to embodiments, both the mapping s420 and transmitting s430 is performed such that an overall transmit power is split equally across each of the reference signals.

In some instances, the transmitting step s430 comprises transmitting first and second reference signals on a first antenna, and transmitting no reference signals on a second antenna, wherein the first and second reference signals are transmitted on the first antenna at a power level greater than a maximum power level of the second antenna. In some instances, the step comprises transmitting a first reference signal on a first antenna; transmitting a second reference signal on a second antenna; and transmitting a third reference signal on the first and second antennas, wherein the transmission of the third reference signal is divided equally between the first and second antennas. In some instances, the step comprises transmitting a first reference signal from a first antenna at a first power level; transmitting a portion of a second reference signal from the first antenna at the first power level; and transmitting a portion of the second reference signal from a second antenna at a second power level, wherein the second power level less than the first power level and the second power level is based at least in part on a power management determination for the second antenna.

According to some embodiments, process 400 also includes communication of configurations, for instance, as set forth with respect to FIG. 3. For example, the process my further comprise receiving, from TRP 104 a configuration for transmission of the set of reference signals; and receiving, from the TRP 104, a reference signal trigger message, wherein at least one of the mapping and transmitting is performed in response to the trigger. In some embodiments, the configuration indicates a usage of non-codebook, codebook, or antenna switching.

Figure 4B:
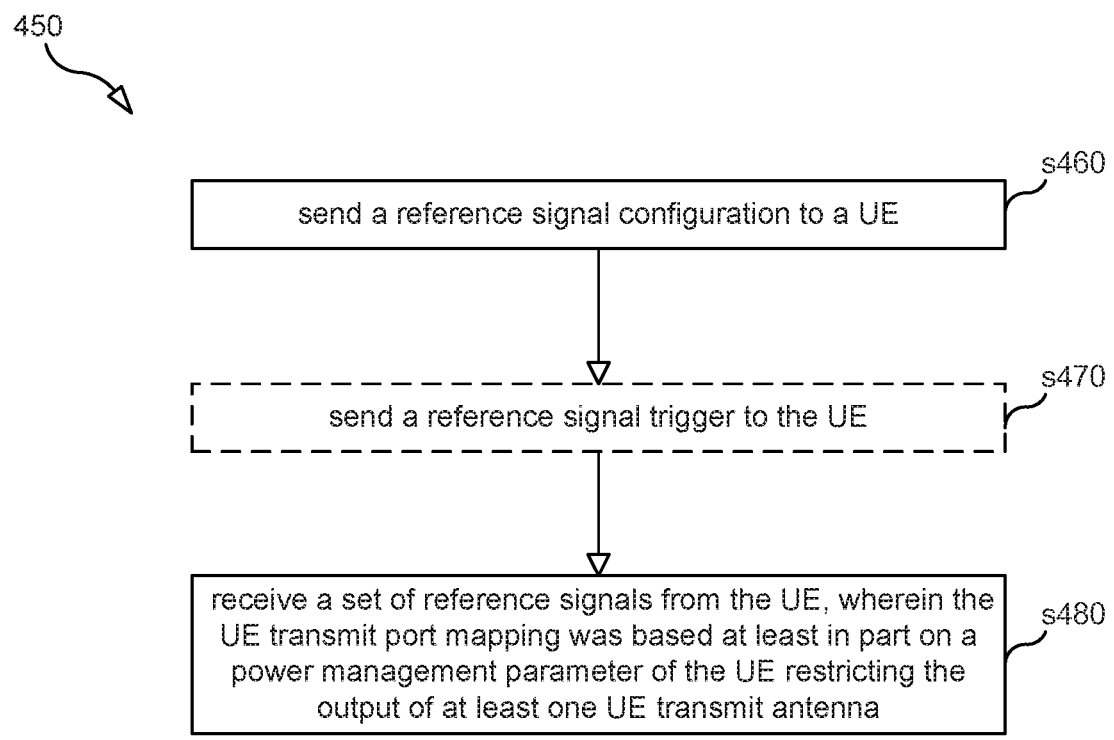

Referring to FIG. 4B, a process 450 according to some embodiments is shown. The process 450 may be performed, for example, by TRP 104 and used to communicate with another node (e.g., UE 102) regarding reference signaling. According to embodiments, a TRP 104 may be adapted to receive one or more reference signals from a UE 102 performing process 400. For instance, the TRP 104 may signal one or more of a power restriction or instruction regarding power restriction considerations to the UE 102, such that one or more steps of process 400 is performed responsive to signaling from TRP 104. According to embodiments, such communications may be in addition to—or part of—those set forth with respect to steps s460, s470, and s480.

In step s460, TRP 104 sends a reference signal configuration to the UE 102. The reference signal configuration may correspond, for instance, to an SRS resource set.

If necessary for the particular configuration and reference type, in step s470, the TRP sends a reference trigger to the UE.

In step s 480, the TRP 104 receives a set of reference signals from the UE 102, wherein the UE 102 transmit port mapping was based at least in part on a power management parameter of the UE restricting the output of at least one UE transmit antenna. According to embodiments, the received set of reference signals was mapped and transmitted in accordance with the processes illustrated with respect to FIGS. 3 and 4A.

Referring now to FIGS. 5A-5D, transmit port to antenna port mapping are illustrated according to some embodiments. FIG. 5A illustrates the format used to illustrate the relationship between the transmit ports (e.g., SRS in this example) and antenna ports ("A") for the mappings shown in FIGS. 5B, 5C, and 5D.

FIGS. 5B. 5C. and 5D illustrate some different SRS port to antenna port mappings ($V_{x,y}$) for a UE 102 with four antenna ports, and where Antenna 4 has been affected with a power restriction (e.g., P-MPR). In FIG. 5B, two SRS ports are transmitted on Antenna Port 1 (A1), and Antenna Ports 2 and 3 are sounded with one SRS port. According to embodiments, the UE 102 avoids transmission on the antenna affected by a power restriction (e.g. P-MPR) in the case that it reduces the SRS output power. In FIG. 5C, the fourth SRS port is divided equally on the three Antenna Ports 1-3. In some instances, this might be an optimized solution. For example, it may be optimal where all UE antennas have a maximum available output power of 17 dBm (23 dBm in total for all four antennas). In this case, the mapping of FIG. 5B would lead to the result that only 14 dB output power can be used per SRS ports, since two SRS ports need to split on the available 17 dBm output power of UE Antenna 1. For the mapping of FIG. 5C, the available power per SRS port instead will be around 16 dBm. Another example is shown in FIG. 5D, where the antenna affected by the power restriction is still used for SRS transmission. However, only about a quarter of the SRS power is transmitted on that antenna compared to the other three antennas, hence the required power from that antenna is 6 dB less than the required power from the other antennas. Depending on the level of restriction, and according to some embodiments, it may still be best to use the restricted antenna but in a modified mapping and transmission (e.g., as shown in FIG. 5D). It is possible that one SRS ports is split equally on the different antennas, either including or excluding the restricted antenna.

According to embodiments, and as shown in FIGS. 5A-5D, the mapping for a particularly restricted antenna port may be the null set or zero.

Figure 6:
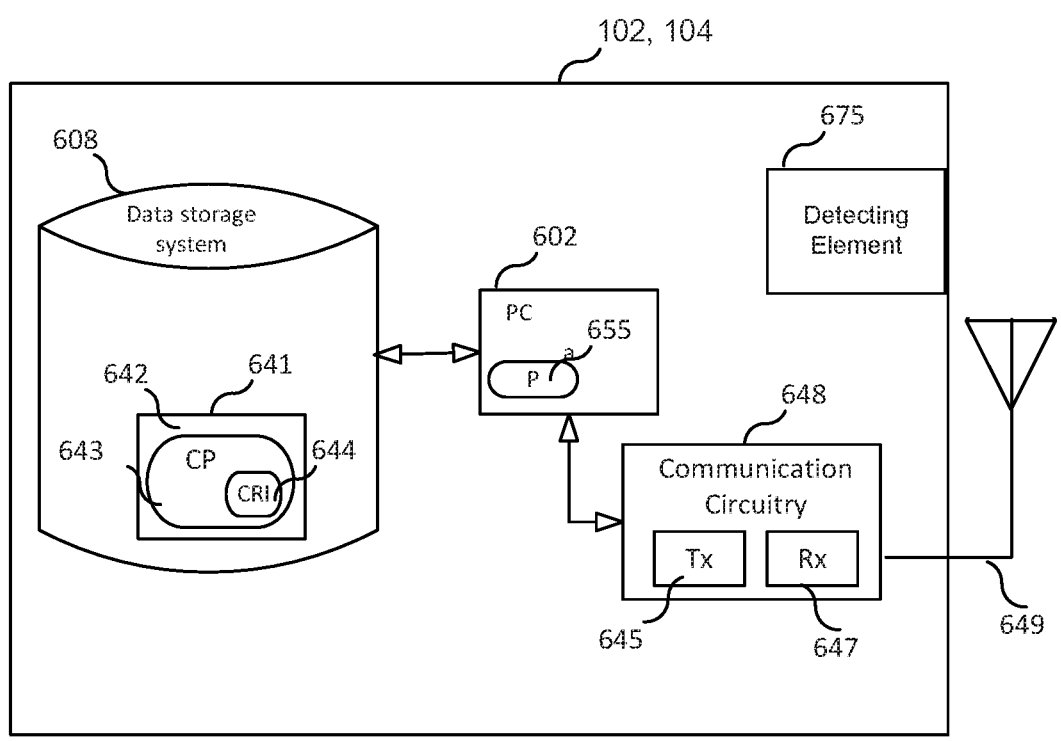
FIG. 6 is a diagram of an apparatus according to embodiments.

FIG. 6 is a block diagram of a node, such as the UE 102 or TRP 104, according to some embodiments. As shown in FIG. 6, the node may comprise: a data processing apparatus (DPA) 602, which may include one or more processors (P) 655 (e.g., a general purpose microprocessor and/or one or more other processors, such as an application specific integrated circuit (ASIC), field-programmable gate arrays (FPGAs), and the like); a transmitter 605 and a receiver 604 coupled to one or more antennas 622 for enabling the node to transmit data to and receive data from another node (e.g., base station); and local storage unit (a.k.a., "data storage system") 608, which may include one or more non-volatile storage devices and/or one or more volatile storage devices (e.g., random access memory (RAM)). In embodiments where the node includes a general purpose microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media, memory devices (e.g., random access memory), and the like. In some embodiments, the CRI 644 of computer program 643 is configured such that when executed by data processing apparatus 602, the CRI causes the node to perform steps described above (e.g., steps described above with reference to the flow charts). In other embodiments, the node may be configured to perform steps described herein without the need for code. That is, for example, data processing apparatus 602 may consist merely of one or more ASICs. Hence, the features of the embodiments described herein may be implemented in hardware and/or software.

Further, then node may include a detecting element 675. According to embodiments, the detecting element 675 comprises one or more cameras, audio or thermal sensors, RF sensors, GPS units, proximity detectors, and impedance measurement devices. The detecting element may be operatively coupled to one or more processing elements, such as processor 655.

Figure 7A:
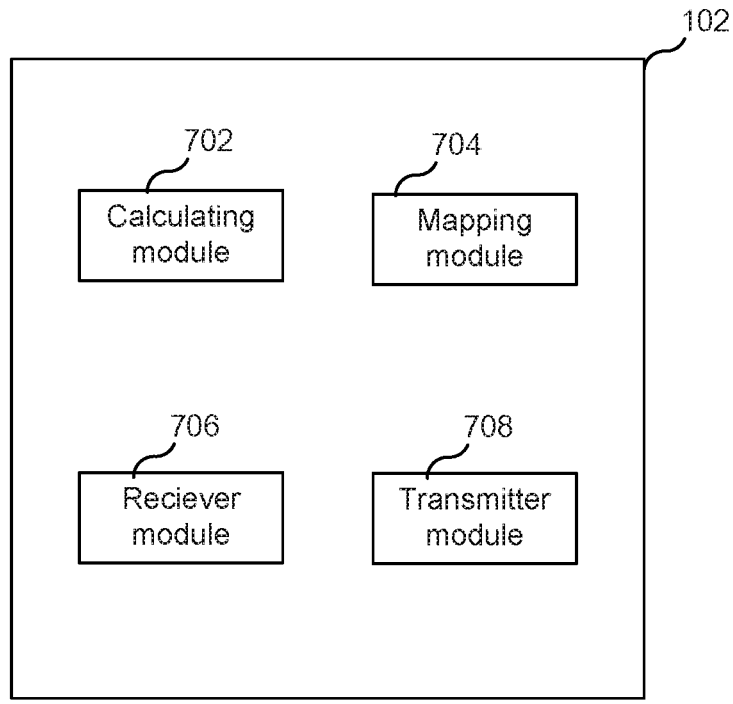
FIGS. 7A and 7B are diagrams of apparatuses according to some embodiments.

FIG. 7A is a diagram showing functional modules of a first node, such as UE 102, according to some embodiments. As shown in FIG. 7A, the first node comprises one or more of a calculating unit 702, a mapping unit 704, a receiver unit 706, and a transmitter unit 706. According to embodiments, calculating unit 702 is arranged to determine one or more parameters, including a power management parameter as described with respect to step s330 of FIG. 3 and step s410 of FIG. 4A. According to embodiments, mapping unit 704 is arranged to perform one or more transmit port to antenna port mappings for the UE 102, including the mapping of step s340 of FIG. 3 and step s420 of FIG. 4A. Receiver unit 706 and transmitter unit 708 are arranged, respectively, to perform the receiving and transmitting steps of FIGS. 3 and 4A.

Figure 7B:
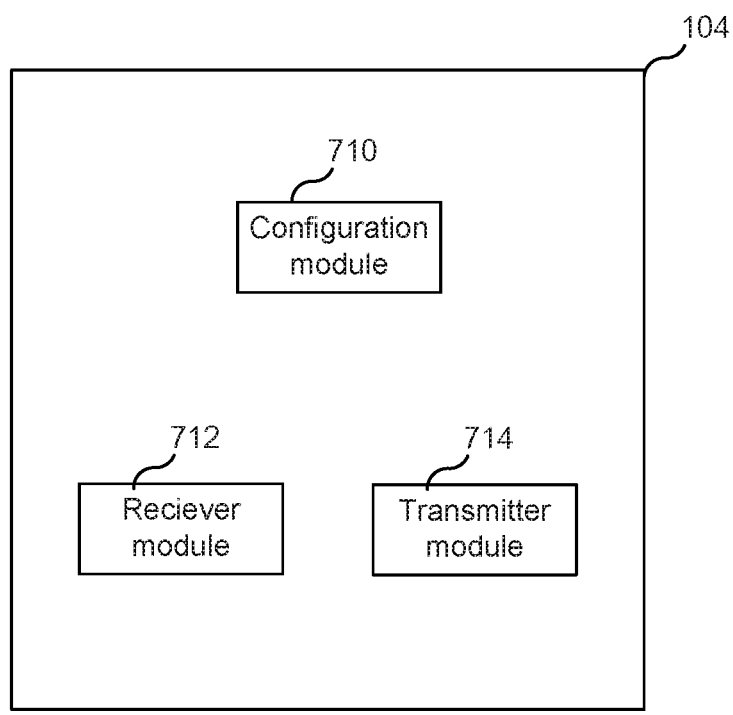

FIG. 7B is a diagram showing functional modules of a second node, such as TRP 104, according to some embodiments. As shown in FIG. 7B, the second node comprises one or more of a configuration unit 710, a receiver unit 712, and a transmitter unit 714. According to embodiments, configuration unit 710 is arranged to prepare and trigger one or more reference signal configurations, including as described with respect to steps s310 and s320 of FIG. 3 and steps s460 and s470 of FIG. 4B. Receiver unit 710 and transmitter unit 712 are arranged, respectively, to perform the receiving and transmitting steps of FIGS. 3 and 4A, including receiving reference signals and sending reference signal configurations and triggers.

An example of an SRS configuration that can be used with respect to some embodiments if provided in 3GPP TS 38.331, Section 6.3.2, and is reproduced in FIGS. 8A-8C. The text of the configuration shown in FIG. 8A continues onto FIG. 8B; the text of FIG. 8B continues onto FIG. 8C.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is implicit that a step must follow or precede another step.

What is claimed:

1. A method of transmitting a set of reference signals from a user equipment (UE) having a plurality of antennas, comprising:

mapping a plurality of transmit ports for said set of reference signals to said plurality of antennas, wherein said mapping is based at least in part on a power management parameter for at least one of said plurality of antennas; and transmitting said set of reference signals according to said mapping, wherein the plurality of antennas comprises a first antenna and a second antenna, and the mapping comprises:
(i) mapping a first transmit port to said first antenna;
(ii) mapping a second transmit port to said second antenna; and
(iii) mapping a third transmit port to said first and second antennas, or the mapping comprises:
(i) mapping a first transmit port to said first antenna;
(ii) mapping a portion of a second transmit port to said first antenna; and
(iii) mapping a portion of said second transmit port to said second antenna, wherein a maximum transmit power of said second antenna is restricted by said power management parameter.

2. The method of claim 1, wherein said set of reference signals is a Sounding Reference Signal (SRS) resource set and said plurality of transmit ports are SRS ports corresponding to said set of reference signals.

3. The method of claim 2, wherein said power parameter is a Power Management Maximum Power Reduction (P-MPR) value, and wherein the transmit power of at least one of said antennas is higher than a maximum transmit power indicated by said P-MPR value.

4. The method of claim 1, further comprising:
determining said power management parameter.

5. The method of claim 4, wherein said UE comprises one or more detectors, wherein said determining said power management parameter is performed using measurements from at least one of said one or more detectors, and wherein said power management parameter is determined based at least in part on avoidance of transmission towards a human.

6. The method of claim 1, wherein said third transmit port is mapped equally to said first and second antennas.

7. The method of claim 6, wherein the plurality of antennas further comprises a third antenna and said mapping further comprises:
mapping no transmit ports to said third antenna.

8. The method of claim 1, wherein the mapping is performed such that each transmit port is transmitted with the same output power.

9. The method of claim 1, further comprising:
determining that said first antenna has the highest available output power of said plurality of antennas,
wherein said mapping is based at least in part on said determining.

10. The method of claim 1, wherein said transmitting comprises:
transmitting a first reference signal on a first antenna;
transmitting a second reference signal on a second antenna; and
transmitting a third reference signal on said first and second antennas,
wherein the transmission of said third reference signal is divided equally between said first and second antennas.

11. The method of claim 1, wherein said transmitting comprises:
transmitting a first reference signal from a first antenna at a first power level;
transmitting a portion of a second reference signal from said first antenna at said first power level; and
transmitting a portion of said second reference signal from a second antenna at a second power level,
wherein said second power level less than said first power level and said second power level is based at least in part on a power management determination for said second antenna.

12. The method of claim 1, wherein the mapping and transmitting is performed such that an overall transmit power is split equally across each of the reference signals.

13. The method of claim 1, further comprising:
receiving, from a transmission point (TRP) a configuration for transmission of said set of reference signals; and
receiving, from said TRP, a reference signal trigger message,
wherein at least one of said mapping and transmitting is performed in response to said trigger.

14. The method of claim 13, wherein said configuration indicates a usage of non-codebook, codebook, or antenna switching.

15. The method of claim 1, wherein said mapping maximizes the total allowed transmit power of said UE over all transmit ports for said set of reference signals.

16. The method of claim 1, wherein at least one of said plurality of antennas is an antenna panel.

17. A user equipment (UE), comprising:
a plurality of antennas;
a memory; and
a processor, wherein said processor is configured to map a plurality of transmit ports for a set of reference signals to said plurality of antennas, wherein said mapping is based at least in part on a power management parameter for at least one of said plurality of antennas; and
transmit said set of reference signals according to said mapping and using said plurality of antennas, wherein
the plurality of antennas comprises a first antenna and a second antenna, and
the mapping comprises:
(i) mapping a first transmit port to said first antenna;
(ii) mapping a second transmit port to said second antenna; and
(iii) mapping a third transmit port to said first and second antennas, or the mapping comprises:
(i) mapping a first transmit port to said first antenna;
(ii) mapping a portion of a second transmit port to said first antenna; and
(iii) mapping a portion of said second transmit port to said second antenna, wherein a maximum transmit power of said second antenna is restricted by said power management parameter.

18. The UE of claim 17, wherein said set of reference signals is a Sounding Reference Signal (SRS) resource set and said plurality of transmit ports are SRS ports corresponding to said set of reference signals.

19. The UE of claim 18, wherein said power parameter is a Power Management Maximum Power Reduction (P-MPR) value, and wherein the transmit power of at least one of said antennas is higher than a maximum transmit power indicated by said P-MPR value.

20. The UE of claim 17, wherein said processor is further configured to determine said power management parameter.

21. The UE of claim 20, wherein said UE further comprises:
one or more detectors, wherein said determining said power management parameter is performed using measurements from at least one of said one or more detectors, and wherein said power management parameter is determined based at least in part on avoidance of transmission towards a human.

* * * * *